(12) United States Patent
Hassani et al.

(10) Patent No.: US 10,988,113 B2
(45) Date of Patent: Apr. 27, 2021

(54) SEAMLESS CONNECTIVITY FEEDBACK FOR VEHICLE AUTHENTICATION

(71) Applicant: FORD GLOBAL TECHNOLOGIES, LLC, Dearborn, MI (US)

(72) Inventors: Ali Hassani, Ann Arbor, MI (US); Hamid M. Golgiri, Livonia, MI (US); Vivekanandh Elangovan, Canton, MI (US); Gerard Edward Szczepaniak, Livonia, MI (US); Joshua Wheeler, Trenton, MI (US); Kirk Leonard, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/577,430

(22) Filed: Sep. 20, 2019

(65) Prior Publication Data

US 2021/0086726 A1    Mar. 25, 2021

(51) Int. Cl.

| | |
|---|---|
| *B60R 25/24* | (2013.01) |
| *H04W 12/06* | (2021.01) |
| *B60R 11/02* | (2006.01) |
| *B60Q 1/50* | (2006.01) |
| *H04W 4/40* | (2018.01) |
| *B60R 11/00* | (2006.01) |

(52) U.S. Cl.
CPC ............. *B60R 25/24* (2013.01); *B60Q 1/50* (2013.01); *B60R 11/0229* (2013.01); *H04W 4/40* (2018.02); *H04W 12/06* (2013.01); *B60R 2011/004* (2013.01)

(58) Field of Classification Search
CPC ............ B60R 25/24; B60R 11/0229; B60R 2011/004; H04W 4/40; H04W 12/06; B60Q 1/50
USPC ............. 340/5.8, 13.31; 455/41.3, 345
See application file for complete search history.

(56) References Cited

U.S. PATENT DOCUMENTS

| | | | |
|---|---|---|---|
| 7,400,232 B2 | 7/2008 | Reichling et al. | |
| 8,126,450 B2 | 2/2012 | Howarter et al. | |
| 8,165,527 B2* | 4/2012 | Sims | G08C 19/28 |
| | | | 455/41.3 |
| 8,224,313 B2* | 7/2012 | Howarter | G07C 9/00309 |
| | | | 455/420 |
| 9,518,408 B1* | 12/2016 | Krishnan | E05B 81/80 |
| 9,595,145 B2* | 3/2017 | Avery | G07C 9/00309 |
| 9,947,159 B2* | 4/2018 | Geerlings | G07C 9/00309 |
| 10,336,295 B2* | 7/2019 | Heller | E05F 15/70 |
| 2018/0375855 A1* | 12/2018 | Karaila | H04L 63/0853 |
| 2020/0070775 A1* | 3/2020 | Linden | E05B 81/82 |
| 2020/0126058 A1* | 4/2020 | Mars | G06Q 30/04 |

* cited by examiner

*Primary Examiner* — Nam V Nguyen
(74) *Attorney, Agent, or Firm* — Michael J. Spenner; Brooks Kushman P.C.

(57) ABSTRACT

A wireless controller is in communication with a plurality of wireless transceivers. An authentication controller is in communication with the wireless controller. The authentication controller is programmed to provide an initial authentication message to a user interface responsive to initiation of an authentication sequence between the vehicle and a mobile device initiating communication with the wireless transceivers, and responsive to completion of the authentication sequence, update the authentication message to indicate that the authentication sequence is complete.

20 Claims, 4 Drawing Sheets

SEAMLESS CONNECTIVITY FEEDBACK FOR VEHICLE AUTHENTICATION

TECHNICAL FIELD

Aspects of the disclosure generally relate to the providing of feedback during vehicle authentication, such as authentication of mobile devices to autonomous vehicles.

BACKGROUND

Vehicle key fobs may be used to allow a user to gain access to a vehicle. Some fob devices operate such that when a key is pressed on the fob, the device sends a code to the vehicle to instruct the vehicle to unlock the vehicle. Passive-entry key fobs operate to provide response to a challenge pulse train sent by the vehicle, where if a proper response is received by the vehicle then the door may be unlocked by a user grasping the door handle. Phone-as-a-key (PaaK) systems are being introduced to allow users to utilize their phones to unlock a vehicle without requiring a key fob device. These systems may operate similar to a key fob, but where the phone communicates with the vehicle over BLUETOOTH or other mobile device wireless technologies.

SUMMARY

In one or more illustrative examples, a vehicle includes a wireless controller, in communication with a plurality of wireless transceivers; and an authentication controller in communication with the wireless controller, programmed to provide an initial authentication message to a user interface responsive to initiation of an authentication sequence between the vehicle and a mobile device initiating communication with the wireless transceivers, and responsive to completion of the authentication sequence, update the authentication message to indicate that the authentication sequence is complete.

In one or more illustrative examples, a method includes providing an initial authentication message to a user interface responsive to initiation of an authentication sequence between a vehicle and a mobile device initiating communication with wireless transceivers of the vehicle; responsive to completion of a first authentication phase of the authentication sequence in which a wireless controller of the vehicle in communication with the wireless transceivers operates as a central and the mobile device operates as a peripheral, updating the authentication message to indicate that authentication is progressing; and responsive to completion of a second authentication phase of the authentication sequence in which the wireless controller operates as the peripheral and the mobile device operates as the central, further updating the authentication message to indicate that the authentication sequence is complete.

In one or more illustrative examples, a non-transitory computer-readable medium includes instructions that, when executed by one or more processors of a vehicle, cause the vehicle to provide an initial authentication message to a user interface responsive to initiation of an authentication sequence between the vehicle and a mobile device initiating communication with wireless transceivers of the vehicle, the initial authentication message including a welcome message; and responsive to completion of the authentication sequence, update the authentication message to indicate that the authentication sequence is complete.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A seamless connection process for autonomous vehicles may include the passive connection of a phone or other mobile device to the autonomous vehicle. However, the connection time for such a process may be on the order of 2-6 seconds. In some cases, further processing may be required (e.g., for a role switch as discussed in detail below), in which case the connection time may be on the order of 7-12 seconds. As such, it may be desirable to provide feedback to the user of progress of the connection process. If feedback is not provided, the user may think there is a problem with the connection process, or may attempt a re-connection, discarding progress towards the initial connection, causing consumer confusion and annoyance. A connectivity protocol for establishing an initial connection without the user making an active connection confirmation may include (i) a process for providing feedback early in the connection process to indicate to the user he or she is being authenticated by the vehicle, and (ii) a process for providing feedback at the end of the connection process to indicate to user that he or she is done being authenticated by the vehicle. The feedback may be incorporated into the service discovery process and may include feedback at one or both of the vehicle exterior displays and the user's mobile device.

Figure 1:
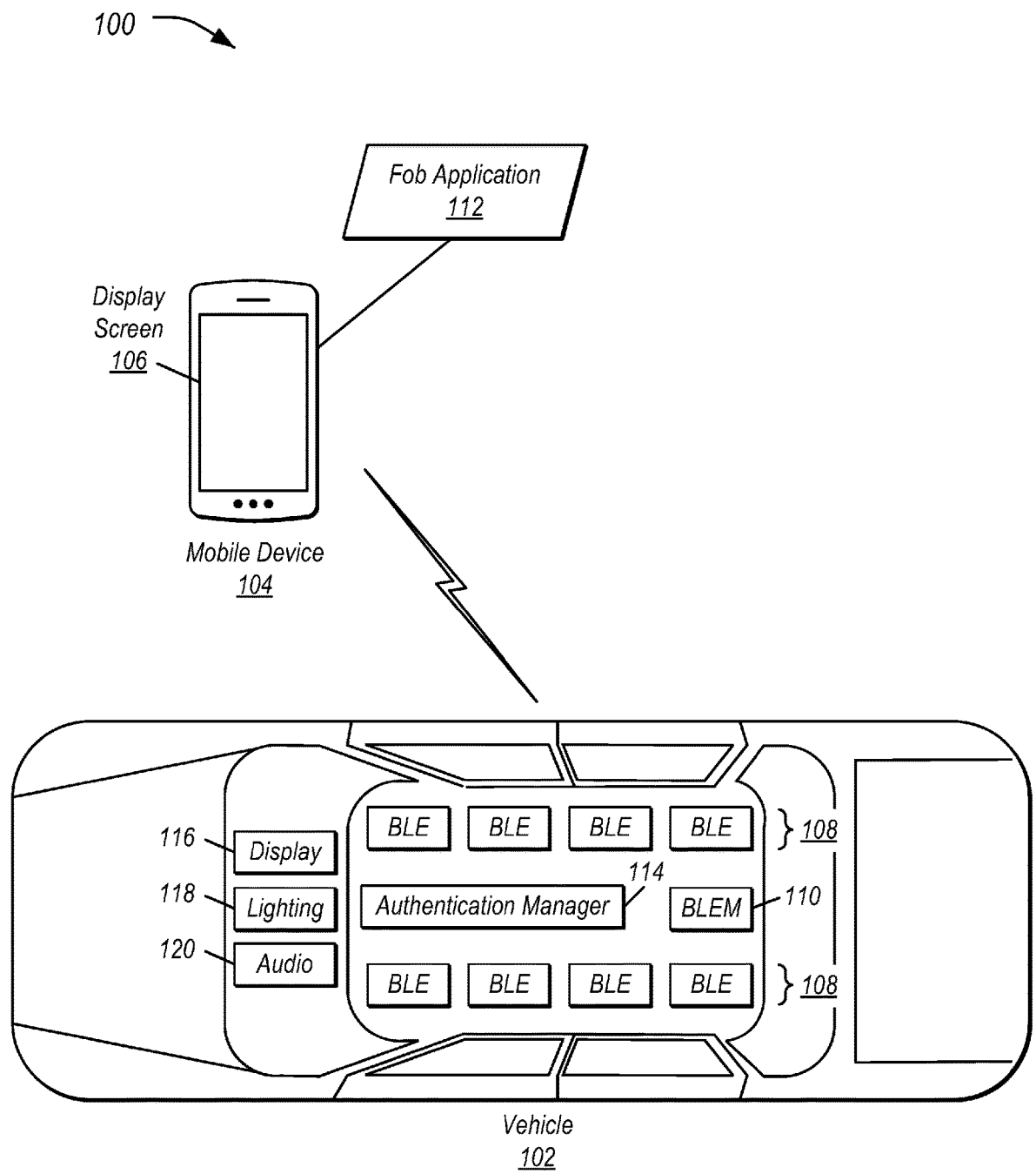
FIG. 1 illustrates an example access control system including a mobile device and a vehicle.

FIG. 1 illustrates an example access control system 100 including a mobile device 104 and a vehicle 102. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained. The mobile device 104 may further include various wireless transceivers, such as a BLUETOOTH or BLE transceiver. The mobile device 104 may also include a display 106 configured to provide a user interface to a user. In some examples, the display 106 may be touch-sensitive, and may be further configured to receive input from the user.

The vehicle 102 may include an array of BLE transceivers 108 that may be configured to facilitate communication between the mobile device 104 and the vehicle 102. For instance, each BLE transceiver 108 may be connected to one or more antennas to form an array that may be used to triangulate or otherwise detect the location of the mobile device 104. The BLE transceivers 108 may be controlled by a BLE module (BLEM) 110 including a memory and a processor programmed to send and receive messaging between the mobile device 104 and the vehicle 102, e.g., to provide for the performance of challenge-response sequences and/or to receive commands from the vehicle 102. In an example, a key fob may connect to the closest-detected BLE transceiver 108 to communicate with the BLEM 110 of the vehicle 102. As shown the vehicle 102 includes eight BLE transceivers 108, but it should be noted that implementations may include more or fewer antennas.

A fob application 112 may include instructions that, when executed by the one or more processors of the mobile device 104, cause the mobile device 104 to perform operations to facilitate access to the vehicle 102. In an example, the fob application 112 may cause the mobile device 104 to display a user interface including controls similar to those of a key fob, e.g., lock, unlock, start, etc. In another example, fob application 112 may cause the mobile device 104 to interact as a passive entry device with the vehicle 102, providing presence information to the BLEM 110 that allows the vehicle 102 to detect that an authorized user of the vehicle 102 is nearby. By executing the fob application 112 to control communication of the mobile device 104 with the BLEM 110 of the vehicle 102, the mobile device 104 may be used to unlock, start, or otherwise access the vehicle 102.

The fob application 112 may be further programmed to allow for the authentication of the mobile device 104 to the vehicle 102 using an authentication manager 114 of the vehicle 102. The authentication manager 114 may be a controller of the vehicle 102 that is in communication with the BLEM 110, as well as with other components of the vehicle 102, such as a display 116, lighting 118, and an audio device 120.

Authentication to autonomous vehicles 102 may utilize a Phone-as-a-Key (PaaK) feature implementation. This may be useful, as users will typically not have possession of a key fob for every available autonomous vehicle 102. PaaK enables a secure connection between the user mobile device 104 and a vehicle connectivity module (such as the BLEM 110), whereby the user position can be localized utilizing the BLE 108 antennas. In the case of PaaK, initial pairing may be simplified due to the persistent nature of the user's ownership of the vehicle; i.e., exchange of the relevant encryption keys and mobile device 104 MAC address could be done once in a local fashion.

The connection process for authenticating mobile devices 104 to autonomous vehicles 102 may include a role switch to exchange the MAC address. As used herein, a role switch is where two devices switch between roles as master and slave in a connection. This role switch is required due to security requirements placed on many mobile devices 104 (such as iPhones), where the connection must be initiated with the mobile device 104 as the master. Then, the BLEM 110 may take over as the master to perform localization. This role switching process may take between 7-12 seconds to complete under standard conditions. Further aspects of the authentication are discussed with respect to FIGS. 2-4.

The display 116 may be one or more screens or other devices used to provide visual content to a user. As some examples, the display 116 may include an exterior panel (such as a door access panel) or an exterior projector, or a screen on the interior of the vehicle 102. The mobile device 104 may additionally or alternately be used to display feedback as well, using a display of the mobile device 104.

The lighting 118 may include one or more LEDs, incandescent bulbs, florescent lights, projectors, or other illumination devices of the vehicle 102. The lighting that is used may include one or more of a headlamp, a tail lamp, a side marker light, or other similar light on the exterior of the vehicle. Puddle lamps or other similar devices may also be leveraged to project specific text on the ground to the user.

The audio device 120 may include speakers or other audio transducers embedded in the door panel of the vehicle 102, within an exterior interaction component (such as the door access panel as mentioned above), the audio system within the vehicle 102, or with a vibration exciter coupled to the exterior door skin turning the door panel itself into a speaker.

Figure 2:
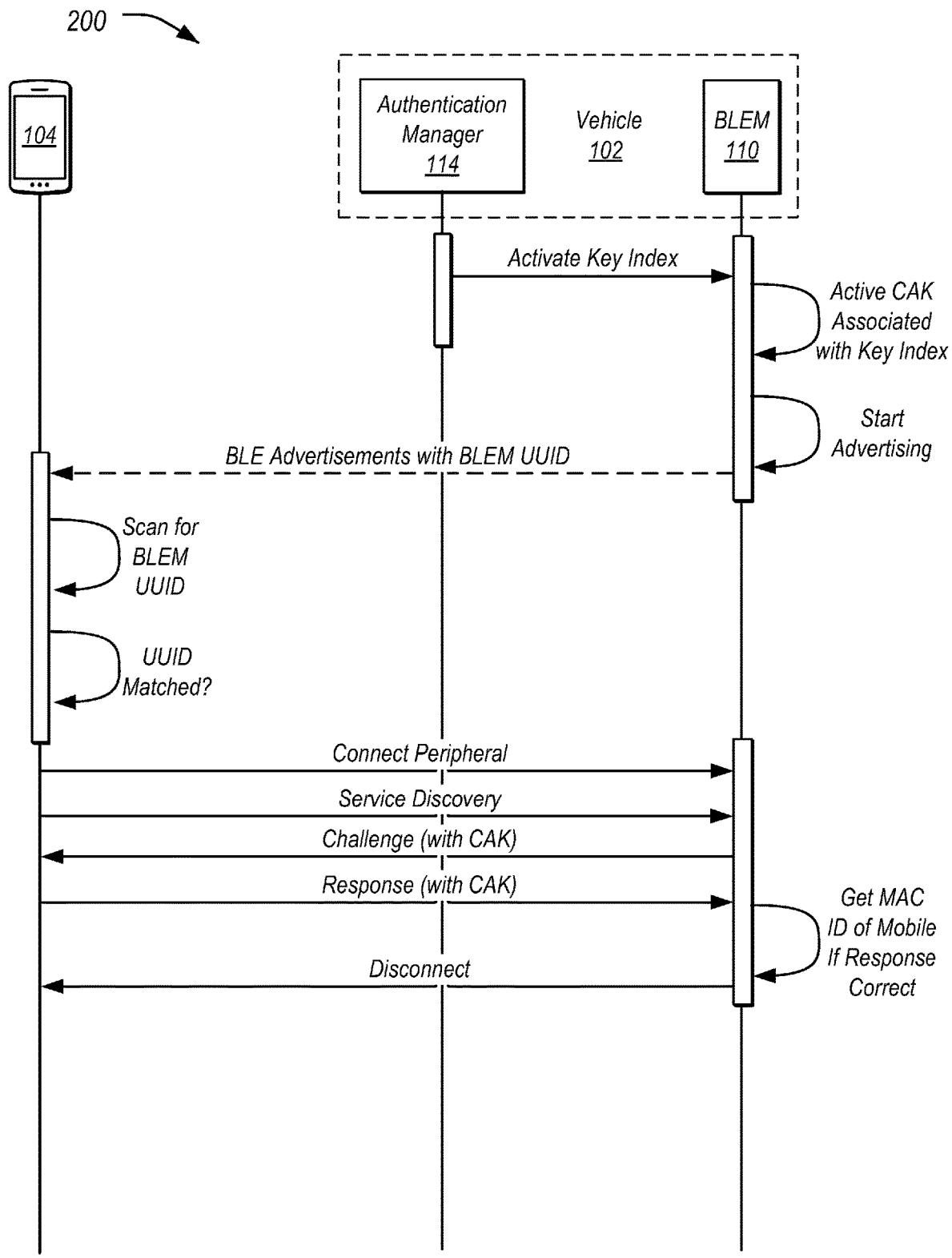
FIG. 2 illustrates an example first portion of a data flow for authentication of a mobile device to a vehicle in which the mobile device is master.

FIG. 2 illustrates an example first portion of a data flow 200 for authentication of a mobile device 104 to a vehicle 102 in which the mobile device 104 is master. As shown, the data flow 200 begins with the authentication manager 114 sending a message to the BLEM 110 to activate a key index. In response, the BLEM 110 activates a customer access key (CAK) associated with the key index. The BLEM 110 (e.g., acting as a peripheral) further starts advertising the key using a UUID of the BLEM 110. The mobile device 104 may scan for the UUID of the BLEM 110 (e.g., acting as a central and initiating service discovery), and if UUID is detected that matches a UUID of the mobile device 104, the mobile device 104 performs a connection request sequence with the BLEM 110 that includes a BLE connect peripheral and BLE service discovery. The BLEM 110 may provide a challenge back to the mobile device 104 including the CAK, and the mobile device 104 may send back a response with the CAK. If the response is correct, the BLEM 110 may retrieve the MAC ID of the mobile device 104. The BLEM 110 may then disconnect from the mobile device 104.

Figure 3:
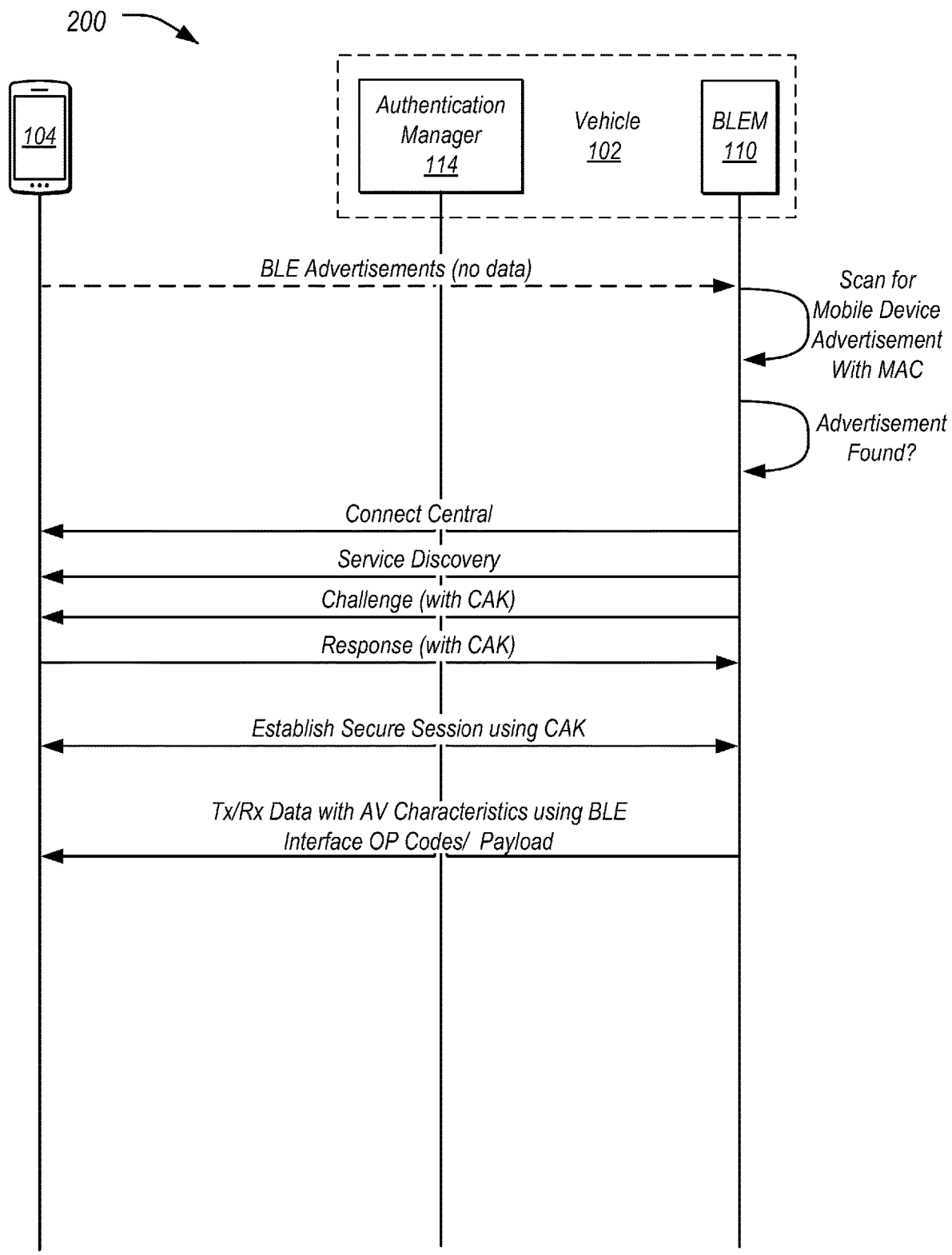
FIG. 3 illustrates an example second portion of a data flow for authentication of a mobile device to a vehicle in which the vehicle is master.

FIG. 3 illustrates an example second portion of a data flow 300 for authentication of a mobile device 104 to a vehicle 102 in which the vehicle 102 is master. As shown, the mobile device 104 now advertises to the BLEM 110 of the vehicle 102, while the BLEM 110 scans for mobile device 104 advertisements that include the MAC. If such an advertisement is found by the BLEM 110, the BLEM 110 performs a BLE connect central with the mobile device 104, as well as BLE service discovery. The BLEM 110 may again provide a challenge to the mobile device 104 including the CAK, and the mobile device 104 may send back a response with the CAK. Responsive to receipt by the BLEM 110 of a correct response, the mobile device 104 and the BLEM 110 may establish a secure session using the CAK. Data with vehicle 102 characteristics may then be transmitted and received between the mobile device 104 and the BLEM 110 as shown.

It should be noted that variations on the authentication sequence described in FIGS. 2 and 3 are possible. In an alternate example, rather than perform a role switch, the authentication sequence may be performed such that the roles of the BLEM 110 and mobile device 104 remain the same throughout authentication. As one possibility, the BLEM 110 may remain as peripheral/slave throughout the authentication sequence, and the mobile device 104 may remain as central/master throughout the authentication sequence.

The authentication sequence as described in FIGS. 2 and 3 may take between 7-12 seconds to complete under standard conditions. An alternate authentication sequence without a role switch may still take 2-6 seconds. Thus, the authentication sequence may feasibly result in a user approaching an autonomous vehicle, repeatedly pressing the unlock button, but not receiving feedback until the process completes. This may result in a poor user experience.

Figure 4:
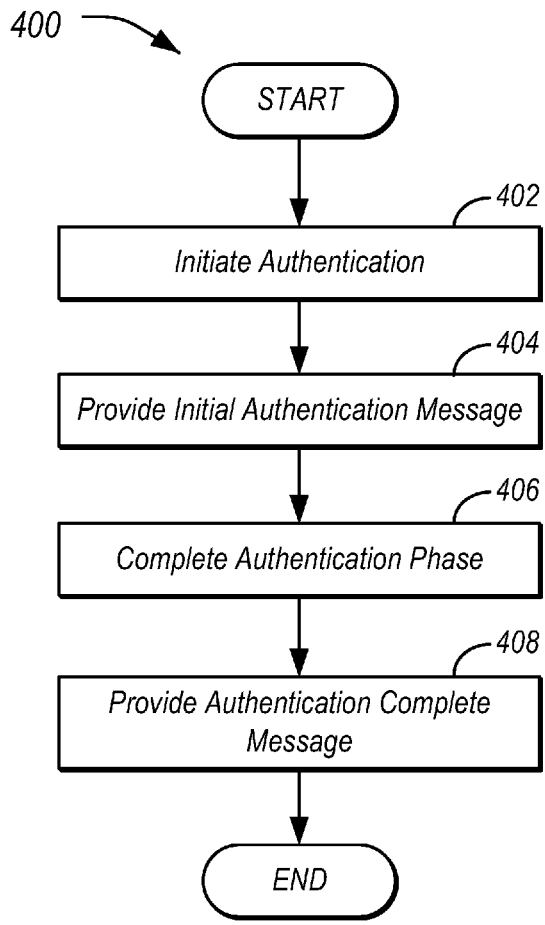
FIG. 4 illustrates an example process for an access control system providing feedback during mobile device to vehicle authentication.

FIG. 4 illustrates an example process 400 for an access control system providing feedback during mobile device to vehicle authentication. As discussed in detail, the process 400 adds feedback on the exterior of the vehicle 102 and/or on the mobile device 104 of the user to improve the user experience.

At operation 402, the vehicle 102 and mobile device 104 may initiate authentication. In an example, the process 400 may begin at a first point of valid wireless connection between the vehicle 102 and mobile device 104.

At 404, an initial authentication message is provided. In an example, responsive to the initiation at operation 402, the display 116 of the vehicle 102 may provide a relevant message to the user to indicate authentication is in progress. The message may include a statement identifying the user by user ID, such as "Welcome <user ID>, Authenticating Access." The user ID may be received, for instance, as part of the authentication process discussed above, and may be a name chosen by the user or the system overall to identify the user.

In another example, additionally or alternately a notification may be displayed on the mobile device 104 responsive to the initiation of authentication. This notification may be analogous to the message on the display 116 of the vehicle 102, such as on a door access panel display 116. As another possibility, the mobile device 104 may trigger a vibration, sound, or notification a connected wearable device to prompt the user to look at the device screen in case the user is not looking at the mobile device 104. In some instances, a notification may be displayed on the display screen 106 of the mobile device 104, where tapping or otherwise selecting the notification by the user may bring the fob application 112 to the foreground, which may increase the Bluetooth polling speed of the mobile device 104 to reduce connection discovery latency.

In yet another example, additionally or alternately to providing visual feedback, audio feedback may be provided. One or more of these audio devices 120 may be utilized to broadcast audible messages to assist with exterior interaction with the vehicle 102. Examples of such audio feedback may include prompts such as "Authentication in Progress", and "Welcome <user id>" (e.g., analogous to the visual feedback.)

As still another example, another potential form of feedback that may additionally or alternately be used, vehicular lighting feedback may be provided (e.g., assuming that the lights will be sufficiently visible at a particular time of day/location). This could be in the form of one or more quick flashes, a gradual increasing or decreasing intensity, a pulsing effect, or a change in color.

At 406, the vehicle 102 and mobile device 104 complete the authentication and perform a role switch. In an example, the vehicle 102 and the mobile device 104 complete operations sufficient to allow the mobile device 104 to provide access to the vehicle 102.

At operation 408, an authentication complete message is provided. For instance, once authentication is complete, the displayed message may transition to an indication of authentication success, such as "<user ID> Access Granted!" This may be context-specific, where the displayed information may alternate if multiple users are being authenticated, or may only acknowledge those users who are in the passive entry zone (e.g., 2 meters from vehicle). Optionally, the display 116 may display trip data for one or more users, such as "<user ID1> stopping at 11th and Main St., <user ID2> stopping at 20300 Rotunda Dr."

In another example, responsive to completion of authentication, the display may indicate a message to the user such as "Authentication complete", "Access granted", or "Welcome". This message may, accordingly, prompt the user to unlock the vehicle 102 door and/or open the vehicle 102 door to enter the vehicle 102.

In yet another example, the lighting effect while authentication is in progress vs. when it has completed. For example, a slow, pulsing light may indicate authentication is in progress, while a quick flash at the end could represent authentication complete. Users may not understand the meaning of the lights for the first few uses, but the users may learn the meaning in time when combined with other methods that are more direct.

Figure 5:
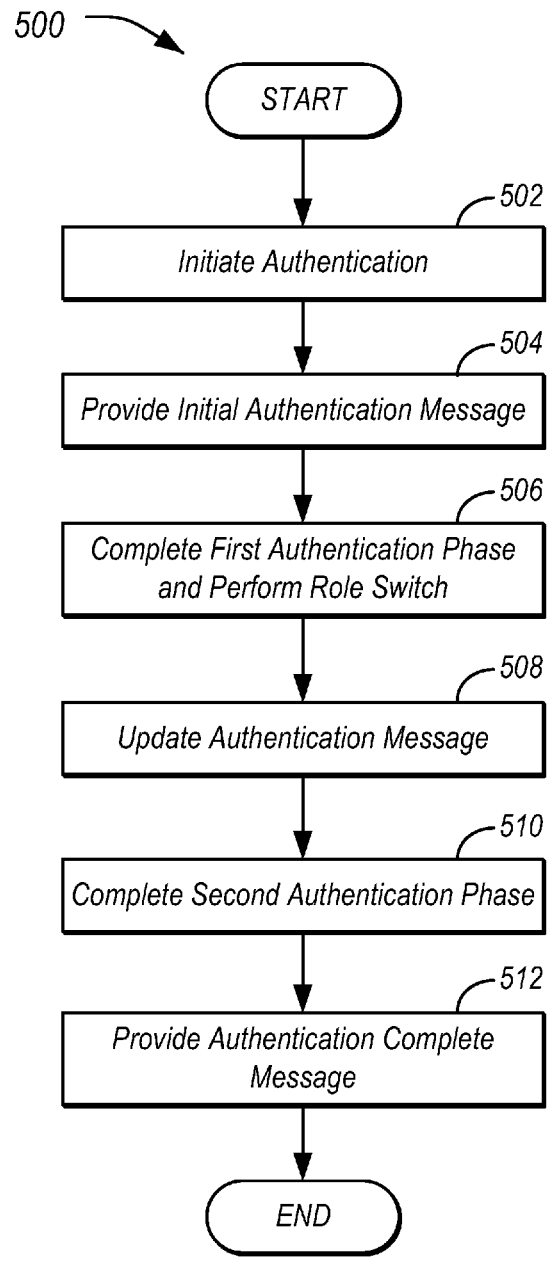
FIG. 5 illustrates an example process for an access control system providing feedback during mobile device to vehicle authentication, including updates keyed to performance of a role switch.

FIG. 5 illustrates an example process 500 for an access control system providing feedback during mobile device to vehicle authentication, including updates keyed to performance of a role switch. Similar to as discussed above with respect to the process 400, the process 500 adds feedback on the exterior of the vehicle 102 and/or on the mobile device 104 of the user to improve the user experience.

At operation 502, the vehicle 102 and mobile device 104 may initiate authentication as discussed above with respect to operation 402 of the process 400. At operation 504, an initial authentication message is provided as discussed above with respect to operation 404 of the process 400.

At operation 506, the vehicle 102 and mobile device 104 complete a first phase of the authentication and perform a role switch. In an example, the vehicle 102 and the mobile device 104 complete the operations as discussed above with respect to FIG. 2. The authentication message is updated at 508. In an example, the authentication message may be updated to indicate progress has been made in the authentication. For instance, text may be updated (e.g., to indicate that 50% of the authentication process has been complete.) As another possibility, additionally or alternately a sound may be emitted to indicate that progress has been made.

At 510, the vehicle 102 and mobile device 104 complete a second phase of the authentication and perform a role switch. In an example, the vehicle 102 and the mobile device 104 complete the operations as discussed above with respect to FIG. 3. At operation 512, an authentication complete message is provided as discussed above with respect to operation 408. After operation 512, the process 500 ends.

Computing devices described herein, such as the mobile device 104, generally include computer-executable instructions where the instructions may be executable by one or more computing devices such as those listed above. Computer-executable instructions, such as those of the fob application 112, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a wireless controller, in communication with a plurality of wireless transceivers; and
   an authentication controller in communication with the wireless controller, programmed to
      provide an initial authentication message to a user interface responsive to initiation of an authentication sequence between the vehicle and a mobile device initiating communication with the wireless transceivers, and
      responsive to completion of the authentication sequence, update the authentication message to indicate that the authentication sequence is complete,
      wherein the authentication sequence includes a first authentication phase and a second authentication phase, such that in the first authentication phase, the wireless controller operates as a central and the mobile device operates as a peripheral, and in the second authentication phase, the wireless controller operates as the peripheral and the mobile device operates as the central, and the authentication controller is further programmed to, responsive to completion of a first authentication phase of the authentication sequence, perform a role switch between the vehicle and the mobile device in which the vehicle and the mobile device switch roles between central and peripheral and update the authentication message to an intermediate authentication message.

2. The vehicle of claim 1, wherein the initial authentication message includes a welcome message, and the authentication complete authentication message indicates one or more of that access is granted and a prompt to enter the vehicle.

3. The vehicle of claim 1, wherein the initial authentication message includes a welcome message, the intermediate authentication message indicates that authentication is progressing, and the authentication complete authentication message indicates that access is granted and/or prompts the user to enter the vehicle.

4. The vehicle of claim 1, wherein the user interface includes a display on an exterior of the vehicle configured to display the authentication message.

5. The vehicle of claim 4, wherein the display is included in a door access panel of the vehicle having one or more controls for facilitating vehicle access.

6. The vehicle of claim 4, wherein the display is a projector on the exterior of the vehicle.

7. The vehicle of claim 1, wherein the user interface includes an audio device configured to provide sound output audible outside the vehicle, the sound output including the authentication message.

8. The vehicle of claim 7, wherein the audio device includes a vibration exciter coupled to an exterior door panel of the vehicle to cause the door panel to operate as a speaker.

9. The vehicle of claim 1, wherein the mobile device is configured to display a notification responsive to the authentication sequence being initiated, wherein selection of the notification causes an access application of the mobile device to move to a foreground state.

10. The vehicle of claim 1, wherein the mobile device is configured to vibrate responsive to the authentication sequence being initiated.

11. The vehicle of claim 1, wherein the user interface includes one or more exterior lights of the vehicle, and the authentication controller is programmed to pulse the exterior lights to indicate authentication is in progress and flash the exterior lights to indicate that authentication is complete.

12. A method comprising:
providing an initial authentication message to a user interface responsive to initiation of an authentication sequence between a vehicle and a mobile device initiating communication with wireless transceivers of the vehicle;
responsive to completion of a first authentication phase of the authentication sequence in which a wireless controller of the vehicle in communication with the wireless transceivers operates as a central and the mobile device operates as a peripheral, performing a role switch between the vehicle and the mobile device such that the vehicle and the mobile device switch roles between central and peripheral and updating the authentication message to indicate that authentication is progressing; and
responsive to completion of a second authentication phase of the authentication sequence in which the wireless controller operates as the peripheral and the mobile device operates as the central, further updating the authentication message to indicate that the authentication sequence is complete.

13. The method of claim 12, further comprising:
including a welcome message in the initial authentication message;
responsive to the completion of the first authentication phase, indicating that authentication is progressing in the updated authentication message; and
responsive to the completion of the second authentication phase, indicating that access is granted and/or prompting the user to enter the vehicle in the authentication complete authentication message.

14. The method of claim 12, wherein the user interface includes a door access panel on an exterior of the vehicle, the door access panel including a display screen configured to display the authentication message and an audio device configured to audibly output the authentication message.

15. The method of claim 12, further comprising audibly outputting the authentication message using an audio device including a vibration exciter coupled to an exterior door panel of the vehicle to cause the door panel to operate as a speaker.

16. The method of claim 12, further comprising displaying a notification on a display of the mobile device responsive to the authentication sequence being initiated, wherein selection of the notification causes an access application of the mobile device to move to a foreground state.

17. The method of claim 12, wherein the mobile device is configured to vibrate responsive to the authentication sequence being initiated.

18. The method of claim 12, wherein the user interface includes one or more exterior lights of the vehicle, and further comprising:
pulsing the exterior lights of the vehicle to indicate authentication is in progress; and
flashing the exterior lights of the vehicle to indicate that authentication is complete.

19. A non-transitory computer-readable medium comprising instructions that, when executed by one or more processors of a vehicle, cause the vehicle to:
provide an initial authentication message to a user interface responsive to initiation of an authentication sequence between the vehicle and a mobile device initiating communication with wireless transceivers of the vehicle, the initial authentication message including a welcome message; and
responsive to completion of the authentication sequence, update the authentication message to indicate that the authentication sequence is complete,
wherein the authentication sequence includes a first authentication phase and a second authentication phase, such that in the first authentication phase, the vehicle operates as a central and the mobile device operates as a peripheral, and in the second authentication phase, the vehicle operates as the peripheral and the mobile device operates as the central, and further comprising instructions that, when executed by one or more processors of a vehicle, cause the vehicle to, responsive to completion of first authentication phase of the authentication sequence, perform a role switch between the vehicle and the mobile device in which the vehicle and the mobile device switch roles between central and peripheral, and update the authentication message to an intermediate authentication message to indicate that authentication is progressing.

20. The medium of claim 19, further comprising instructions that, when executed by one or more processors of a vehicle, cause the vehicle to:
audibly output the authentication message using an audio device of the user interface;
visually output the authentication message using a display of the user interface on the exterior of the vehicle;
request the mobile device to vibrate responsive to the authentication sequence being initiated;
pulse one or more exterior lights of the vehicle to indicate authentication is in progress; and
flash the one or more exterior lights of the vehicle to indicate that authentication is complete.

* * * * *